(12) United States Patent
Tuan et al.

(10) Patent No.: US 10,459,255 B2
(45) Date of Patent: Oct. 29, 2019

(54) COMPENSATING VISUAL IMPAIRMENT BY USING AN EYE-MOUNTED DISPLAY

(71) Applicant: Spy Eye, LLC, Los Gatos, CA (US)

(72) Inventors: Kuang-mon Ashley Tuan, Mountain View, CA (US); Michael West Wiemer, San Jose, CA (US)

(73) Assignee: Tectus Corporation, Saratoga, CA (US)

(*) Notice: Subject to any disclaimer, the term of this patent is extended or adjusted under 35 U.S.C. 154(b) by 26 days.

(21) Appl. No.: 15/886,405

(22) Filed: Feb. 1, 2018

(65) Prior Publication Data

US 2019/0235283 A1 Aug. 1, 2019

(51) Int. Cl.
*G02C 11/00* (2006.01)
*G02C 7/04* (2006.01)
*G06K 9/00* (2006.01)

(52) U.S. Cl.
CPC ............... *G02C 11/10* (2013.01); *G02C 7/04* (2013.01); *G06K 9/00302* (2013.01); *G02C 2202/10* (2013.01)

(58) Field of Classification Search
CPC ...... G02C 11/10; G02C 7/04; G02C 2202/10; G06K 9/00302
USPC ................................. 351/41, 159.01, 159.02
See application file for complete search history.

(56) References Cited

U.S. PATENT DOCUMENTS

| 4,871,247 | A | 10/1989 | Haynes |
| 7,431,458 | B2 | 10/2008 | Jongsma et al. |
| 7,542,210 | B2 | 6/2009 | Chirieleison, Sr. |
| 8,430,310 | B1 | 4/2013 | Ho et al. |
| 9,028,068 | B2 | 5/2015 | Chang |
| 9,040,923 | B2 | 5/2015 | Sprague et al. |
| 9,111,473 | B1 | 8/2015 | Ho et al. |
| 9,180,053 | B2 * | 11/2015 | Dalal ............... A61F 9/08 |
| 2011/0221659 | A1 | 9/2011 | King, III et al. |
| 2015/0362733 | A1 * | 12/2015 | Spivack ........... A63F 13/26 345/633 |

(Continued)

FOREIGN PATENT DOCUMENTS

WO     WO 2006/015315 A2    2/2006

OTHER PUBLICATIONS

Tuan et al. "Method to Attenuate Eye Growth" Jul. 15, 2016, p. 3-29.*

(Continued)

*Primary Examiner* — Tuyen Tra
(74) *Attorney, Agent, or Firm* — Fenwick & West LLP

(57) ABSTRACT

An eye-mounted display is used to enhance vision of a user with visual impairment. Images of a user's unimpaired view of a surrounding environment are captured. These image are modified to compensate for the user's visual impairment. For example, the captured images can be magnified, an angular extent of the captured images can be compressed, or a contrast of the captured images can be enhanced. Also, the captured images can be modified by including identification of an object, a face, or an emotion. For a captured image including text, the text in the captured images can be modified. The eye-mounted display projects the compensated images onto the user's retina. When the user's retina has a damaged section, the eye-mounted display projects the compensated images away from the damaged section.

19 Claims, 9 Drawing Sheets

(56) References Cited

U.S. PATENT DOCUMENTS

2016/0270648 A1* 9/2016 Freeman .............. A61B 3/0025

OTHER PUBLICATIONS

Lu, J. et al., "A 1 TOPS/W Analog Deep Machine-Learning Engine With Floating-Gate Storage in 0.13μm CMOS," IEEE Journal of Solid-State Circuits, Jan. 2015, pp. 270-281, vol. 50, No. 1.

Ioannou, S. et al., "Proximity and Gaze Influences Facial Temperature: A Thermal Infrared Imaging Study," Frontiers in Psychology, Aug. 2014, pp. 1-12, vol. 5, Article 845.

Kim, J. et al., "3D Multi-Spectrum Sensor System with Face Recognition," Sensors, 2013, pp. 12804-12829, vol. 13.

Liu, Y. et al., "Facial Expression Recognition with Fusion Features Extracted from Salient Facial Areas," Sensors, 2017, pp. 1-18, vol. 17, No. 712.

Merla, A., "Thermal Expression of Intersubjectivity Offers New Possibilities to Human-Machine and Technologically Mediated Interactions," Frontiers in Psychology, Jul. 2014, pp. 1-6, vol. 5, Article 802.

\* cited by examiner

COMPENSATING VISUAL IMPAIRMENT BY USING AN EYE-MOUNTED DISPLAY

BACKGROUND

1. Technical Field

This disclosure relates generally to visual impairment, and more particularly, to using an eye-mounted display to compensate for visual impairment.

2. Description of Related Art

Visual impairment refers to eye problems that are not easily addressed with glasses or contact lenses. Impairment may be caused by diseases or injuries of the eye or retinal disorders, as examples. In many cases, retinal damage is permanent. However, damage may be localized to certain parts of the retina while other parts of the retina function normally. Macular degeneration and diabetic retinopathy may cause impaired central vision while not affecting peripheral vision, for example. On the other hand, retinitis pigmentosa and glaucoma may cause impaired peripheral vision while not affecting central vision.

Currently available methods to compensate for a person's localized visual impairment include using visual aid devices to help the person navigate his or her surroundings to carry out his or her daily activities. For example, a magnifier can help people with reduced central vision to read smaller print using the part of the retina that is still functioning. A reversed telescope can condense the view so a person with restricted peripheral vision can see more of his/her surroundings using the remaining central vision. However, these visual aid devices are obvious to bystanders. Many people with localized visual impairment feel self-conscious about using these devices in public. Consequently, the currently available methods have drawbacks of not being sufficiently utilized to compensate visual impairment.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

Figure 1A:
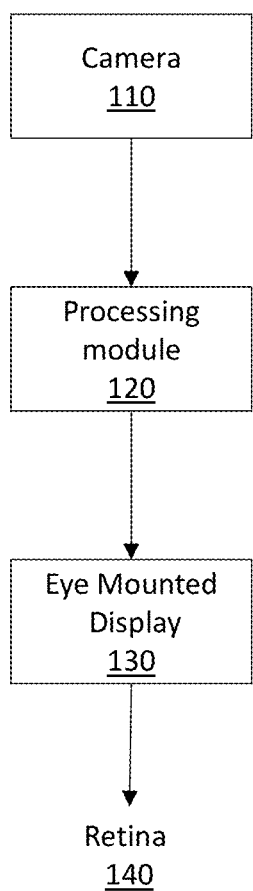
FIG. 1A is a block diagram of a vision enhancement system using an eye-mounted display.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A vision enhancement system uses an eye-mounted display to enhance vision of a user with visual impairment. The eye-mounted display is contained in a contact lens. The content lens, while being worn by the user, does not appear to be out of the ordinary to bystanders. Thus, the user does not feel self-conscious about using the vision enhancement system in public. That encourages the user to participate in public activities with confidence and comfort. For a user whose retina has a damaged section, the eye-mounted display can present images onto a section of the retina that is away from the damaged section. Because the display is eye-mounted, it will always project to the same section of the retina, unlike a conventional display. An image projected by the display always appears in the same part of a person's field of view and is incident on the same part of the person's retina, regardless of where the person looks. Accordingly, the user can obtain an improved view, which is important for social interaction and safety of the user.

The vision enhancement system includes a camera, a processing module, and the eye-mounted display. The camera captures images of a user's unimpaired view of a surrounding environment. The user's unimpaired view is a view of the surrounding environment that the user would have without the visual impairment. One or more objects can be located in the surrounding environment, such as a person, a structure (e.g., a building, a tree, a street, etc.), an animal, text, and so on. The processing module modifies the captured images to compensate for the user's visual impairment. These will be referred to as compensated images. Examples of possible modifications include the following: magnifying the captured images, compressing an angular extent of the captured images, enhancing a contrast of the captured images, enhancing facial features of a person's face in the captured images, including identification of one or more objects in the captured images, detecting an edge included in the captured images, including information providing situational awareness in the captured images, enlarging a font size of text in the captured images, and changing a color of text in the captured images.

The eye-mounted display receives the compensated images and projects the compensated images onto the user's retina. For users whose retina has a damaged section, the eye-mounted display can project images onto a section of the retina that is outside the damaged section. Accordingly, the user's visual impairment is compensated. In some embodiments, the eye-mounted display includes a projector mounted in a contact lens (aka, a femtoprojector). The camera and the processing module can be mounted in the contact lens as well. Alternatively, the camera and the processing module can be mounted in other types of wearable devices, such as a necklace or a headpiece.

As an example, FIG. 1A is a block diagram of a vision enhancement system 100 that includes a camera 110, a processing module 120, and an eye-mounted display 130. Some other embodiments of the vision enhancement system 100 have different components than those described here. For example, the vision enhancement system 100 may additionally have a power system that provides power to the camera 110, the processing module 120, and the eye-mounted display 130. Also, the vision enhancement system 100 may include an audio module that plays audio to the user. The vision enhancement system 100 can include more than one camera or more than one eye mounted display, e.g., to enhance vision of both eyes of a user. Alternately, it can include a single eye mounted display that enhances the vision of just one eye. Similarly, the functions can be distributed among the components in a different manner than is described here.

Figure 1B:
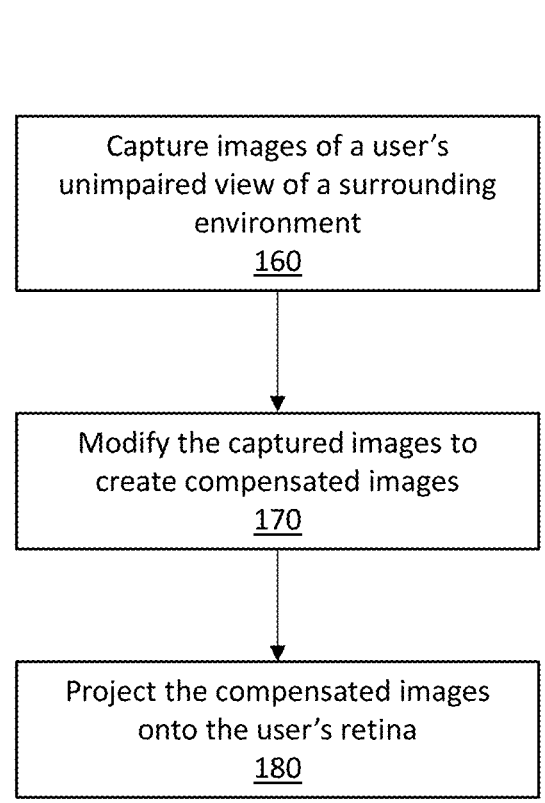
FIG. 1B is a flow diagram of a process for enhancing vision of a user with visual impairment.

FIG. 1B is a flow diagram of a process 150 for enhancing the vision of a user with visual impairment. The process 150 is performed by the vision enhancement system 100. The camera 110 captures 160 images of a user's unimpaired view of a surrounding environment. The user's unimpaired view is a view of the surrounding environment that the user would have if the user had normal vision. However, because the user has visual impairment, the user's real view of the surrounding environment is different from the unimpaired view. An example of visual impairment is having a damaged section in the user's retina. Consequently, a portion of the user's unimpaired view would be imaged by the user's eye to the damaged section. The damaged section can be a foveal section. Alternatively or additionally, the damaged section can include a peripheral section of the retina. A user with a damaged section of the retina suffers from visual disturbances, such as blurriness, decreased vision, color distortion, afterimages, blind spots, vision loss, or combinations thereof. Another example of visual impairment is impaired adaption of the user's eye to dark environment, e.g., night blindness or slow adaption of the eye when transitioning from brighter to darker environments.

Due to the visual impairment, the user has low vision or even loss of vision, which can cause loss of variety of experience, loss of ability to get around, and loss of control of environment. The user can have difficulty reading, identifying an object, or recognizing a face or emotion. Visual impairment can even have safety risks. For example, the user may not see a car coming towards him.

In some embodiments, the camera 110 operates in a visible wavelength band (i.e., ~390 nm to 770 nm). The field of view of the camera 110 may be the same, smaller or larger than an unimpaired field of view of the user's eye. The camera includes optics and a sensor array. In some other example designs, the camera 110 operates in a non-visible wavelength band, such as an infrared (IR) band (i.e., ~750 nm to 10 μm). For example, the camera 110 may be a thermal infrared sensor. Time-of-flight or other sensors may also be used.

In some embodiments, the camera 110 is mounted in a contact lens that contains the eye-mounted display 130. The camera 110 moves with the user's eye as the user's eye rotates in its sockets. The images captured by the camera 110 includes the user's unimpaired view of the surrounding environment. In some instances, instead of mounted in a contact lens, the camera 110 may be mounted on a headpiece or a neck piece. Eye tracking and/or head tracking may be used to detect positions and/or orientations of the user's eye. The field of view of the camera 110 can be adjusted based on the detected positions and/or orientations of the user's eye.

The camera 110 may capture images at a predetermined frame rate. For example, the camera 110 captures an image of the surrounding environment 30 times per second. Alternatively, the camera captures images at a frame rate set by the user. For example, the user, while reading a book, can set the frame rate based on the user's reading speed. The user can increase the frequency while watching a movie or moving around in public. The camera 110 outputs the captured images to the processing module 120.

The processing module 120 modifies 170 the captured images to create images that compensate for the user's visual impairment. For example, if the user's foveal region is damaged, the processing module 120 might magnify the captured images and then project the magnified images to the undamaged retina away from the fovea. The processing module 120 sufficiently magnifies the captured images so that when projected to the undamaged peripheral regions of the retina, the compensated images have similar resolution as the original images projected to an undamaged foveal region.

As another example, if the user's peripheral region is damaged, the processing module 120 might compress an angular extent of the captured images and then project the compressed images to the undamaged foveal region. By compressing the angular extent, the compensated images will span a same field of view (i.e., provide peripheral cue) at the fovea, as the original images projected to the undamaged retina.

As yet another example, the processing module 120 can enhance a contrast of the captured images or enhance facial features of a person's face. The captured images with enhanced contrast can be compared to images stored in a database for identifying specific people, e.g., friends or relatives of the user. In embodiments where the captured images includes text, the processing module 120 can modify the text, e.g., enlarging a font size of the text, changing a color of the text, changing a background color of the text, or adding an effect to the text.

The processing module 120 may also add additional information to the compensated images. For example, the processing module 120 identifies an object in the captured images and includes identification of the object in the compensated images. The processing module can further identify an emotion of a person in the captured images based on the person's face and include identification of the emotion in the compensated images. Identification of an object, a face, or an emotion can be performed by a machine learning model. The machine learning model outputs identification of the object, a face, or emotion. In addition to the modifications described above, the processing module 120 may perform other types of modifications of the captured images. The processing module 120 can further determine a speed of an object and include the speed or a message associated with the speed to the captured images. For instance, when the captured images include a car, the processing module 120 determines a speed of the car and includes a warning of the car in the compensated images. The warning can be a message to notify the user to avoid the car.

Modification of the captured images by the processing module 120 compensates for the user's visual impairment. In some embodiments, the processing module 120 modifies the compensated images based on information about the user's visual impairment, e.g., information received from or programmed by the user's doctor or the user himself. For example, the processing module 120 magnifies the compensated images when a foveal section of the user's retina is damaged and compresses an angular extent of the captured images when a peripheral section of the user's retina is damaged. The reverse situation can also be useful. As another example, the processing module 120 enhances a contrast of the captured images when the visual impairment is impaired adaptation of the eye to dark environment or enhances a contrast during a transition from brighter to darker environment when the visual impairment is slow adaption of the user's eye during said transition. Also, the processing module 120 may receive requests from the user for particular types of modification. For example, the user requests to identify facial emotion if the captured images includes a person's face and the processing module 120 identifies an emotion of the person based on the person's face in the captured images and modifies the captured images to include identification of the emotion. As another example, the processing module 120 may analyze faces and facial orientation to determine whether people are talking to the user. As a final example, the processing module 120 may distinguish between different denominations of paper money or may detect counterfeits.

In addition to modifying the captured images, the processing module 120 can also generate audio based on the captured images. For example, for captured images including text, the processing module 120 generates audio of the text. As another example, for captured images including an object, the processing module 120 generates audio for identifying the object or delivering a message associated with the object to the user. If the object is a person, the audio could describe the person, such as gender, ethnicity, or height. The audio is played to the user, e.g., by an audio module of the vision enhancement system. The processing module 120 may be located in the contact lens or outside, for example in an accessory.

The eye-mounted display 130 projects 180 the compensated images onto the user's retina 140. The eye-mounted display 130 can select a particular section of the retina to project or not to project the compensated images. For example, in instances where the user's retina has a damaged section, the eye-mounted display 130 projects the compensated images away from the damaged section. When the damaged section is a foveal section of the retina, the eye-mounted display 130 projects the compensated images to a more peripheral section of the retina. Likewise, when the damaged section is a peripheral section of the retina, the eye-mounted display 130 projects the compensated images to a more central section of the retina. The damaged section of the retina can be determined by a doctor and input into the eye-mounted display 130 or a controller controlling operation of the eye-mounted display 130.

An example of the eye-mounted display 130 has been proposed by Deering in U.S. Pat. No. 8,786,675, "Systems using eye-mounted displays." As proposed by Deering, the eye-mounted display 130 is based on a tiny projector mounted inside a contact lens. The projector projects images onto the retina of a person wearing the lens. The projector must be very small to fit in the contact lens, so small that Deering called it a "femtoprojector". A typical femtoprojector preferably is no larger than about a millimeter in any dimension.

An example design of the femtoprojector includes an array of display pixels, for example individually addressable LEDs. The light from the display pixels is projected onto the retina with pixel resolutions that are highest for pixels projected to a foveal section of the retina and lower for other sections (e.g., peripheral sections) of the retina. The femtoprojector also includes display optics that projects light from the display pixels to the corresponding portion of the retina. The portion of the retina to which light is projected is fixed as the user's eye rotates in its socket. Thus, the femtoprojector forms a visual sensation of the compensated image. Each such projection of light propagates through less than the full aperture of the eye.

The vision enhancement system 100 can be turned on/off by different types of commands. Example types of commands include a predetermined sequence of eye blinking, a verbal command from the user, a hand gesture of the user, and a signal from a device coupled to the system 100. The system 100 can be automatically turned on by the user wearing the eye-mounted display 130. It may also be turned on or off due to changes in ambient lighting, for example when traveling between light and dark environments.

Figure 2A:
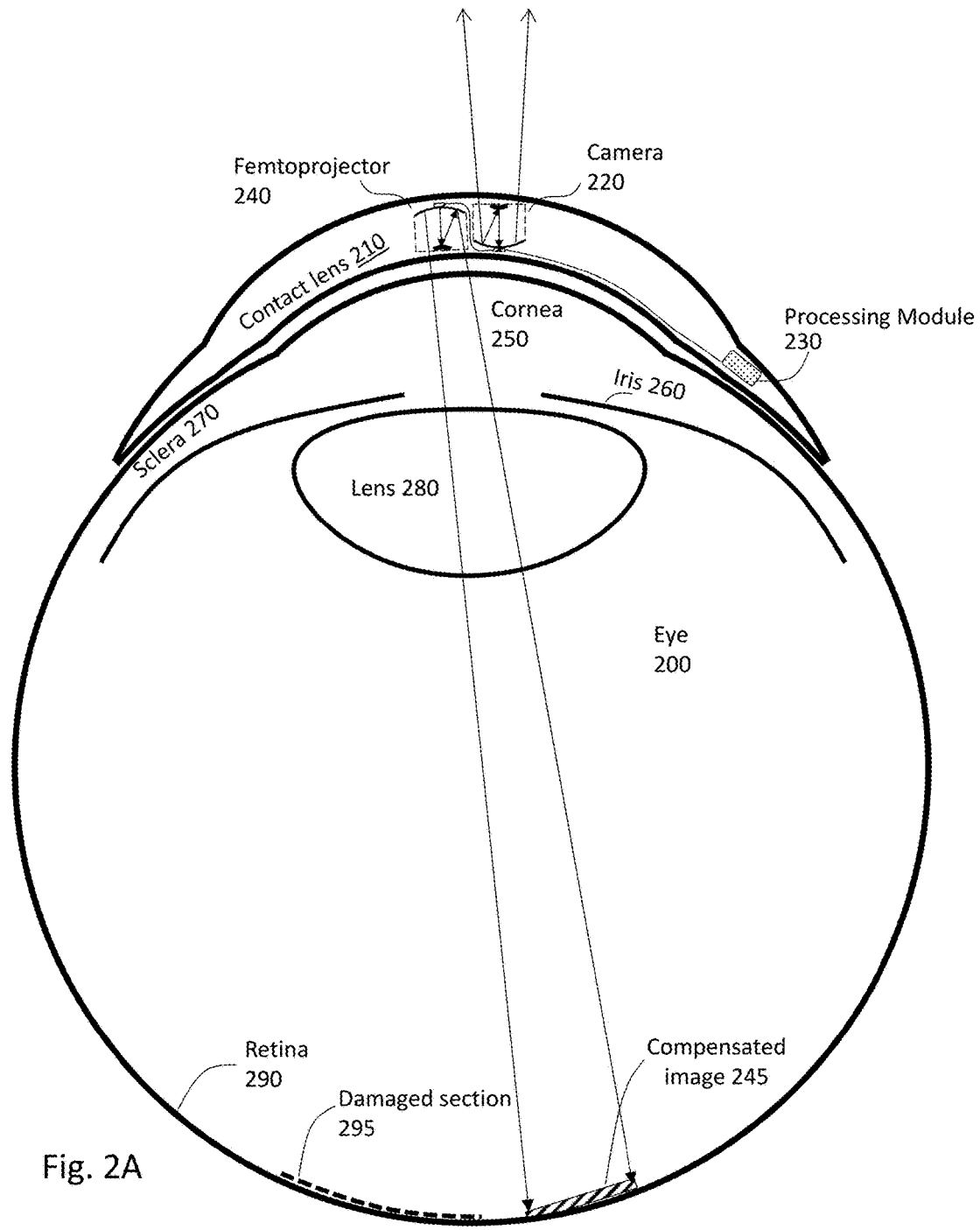
FIG. 2A shows a cross sectional view of a contact lens device suitable for use in a vision enhancement system.

FIG. 2A shows a cross sectional view of a contact lens device 210 suitable for use in a vision enhancement system. As shown in FIG. 2A, a camera 220, a processing module 230, and a femtoprojector 240 are mounted in the contact lens 210. FIG. 2A shows an embodiment using a scleral contact lens but the contact lens 210 does not have to be scleral. The contact lens 210 is separated from the cornea 250 of the user's eye 200 by a tear layer. Over the cornea 250, the tear layer may be as thick as a hundred microns or more while it may be only a few microns thick over the sclera 270. The aqueous humor of the eyeball is located between the cornea and the crystalline lens 280 of the eye. The vitreous fills most of the eyeball including the volume between the crystalline lens 280 and the retina 290. The iris 260 limits the aperture of the eye.

The contact lens 210 preferably has a thickness that is less than two mm, and the femtoprojector 240 preferably fits in a 2 mm by 2 mm by 2 mm volume. The contact lens 210 is comfortable to wear and maintains eye health by permitting oxygen to reach the cornea 250.

As shown in FIG. 2A, the camera 220 is an outward-facing camera, meaning the camera "looks" away from the eye 200 and captures images of an area where the eye 200 is pointed. The camera 220 is placed adjacent to the femtoprojector 240 and connected to the processing module 230. In other designs, the camera 220, the processing module 230, and the femtoprojector 240 can be stacked on top of each other, for example, with the processing module 230 in the middle. Alternatively, they can be adjacent to each other. In some embodiments, electronics and circuitry of the camera 220, the processing module 230, and the femtoprojector 240 are implemented on a single chip. Signal paths between the three components of the system can be registerless signal paths. No buffer is necessary.

In the example design of FIG. 2A, the femtoprojector 240 projects a compensated image 245 to the retina 290 away from a damaged section 295. The optical path from the image source in the femtoprojector 240 to the compensate image 245 on the retina 290 does not include any air gaps, although this is not required. As a result, the femtoprojector 240 embedded in contact lens 210 is insensitive to the air—cornea interface that provides most of the focusing power in an unaided eye. Further, the system is not affected by variations in cornea shape that occur from one person to another.

Figure 2B:
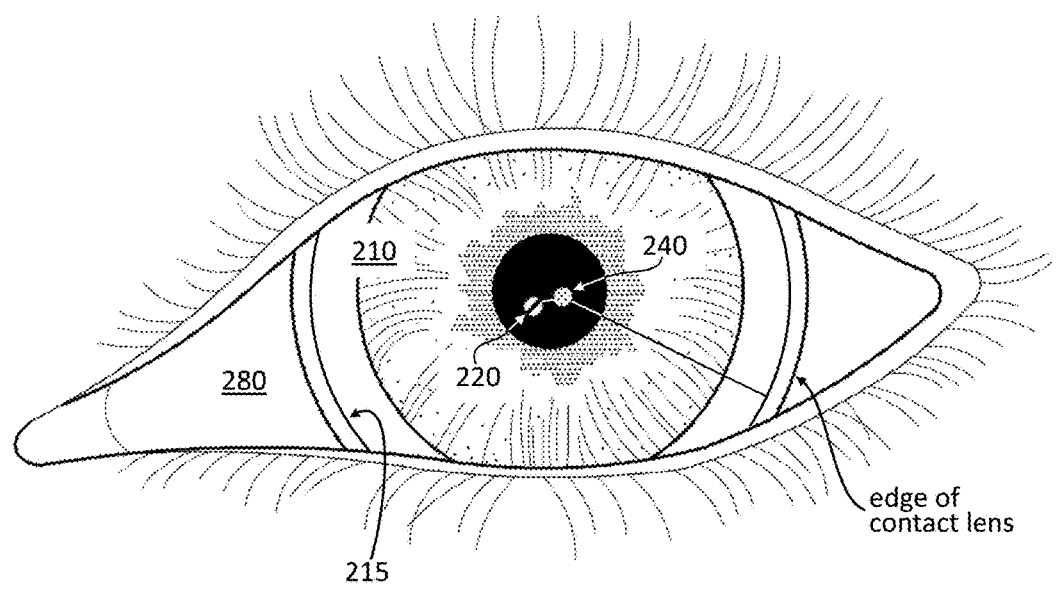
FIG. 2B shows a view of the contact lens device mounted on a user's eye.

FIG. 2B shows a front view of the contact lens 210 mounted on the user's eye 200. The contact lens 210 is placed on the surface of the eye 200. The contact lens 210 includes a coil 215. In some embodiments, the coil 215 is a power coil that transfers power from a power source (e.g., a battery) to the camera 220, the processing module 230, and the femtoprojector 240 mounted in the contact lens. The coil 215 may receive power from the power source wirelessly, e.g., by magnetic induction.

Figure 2C:
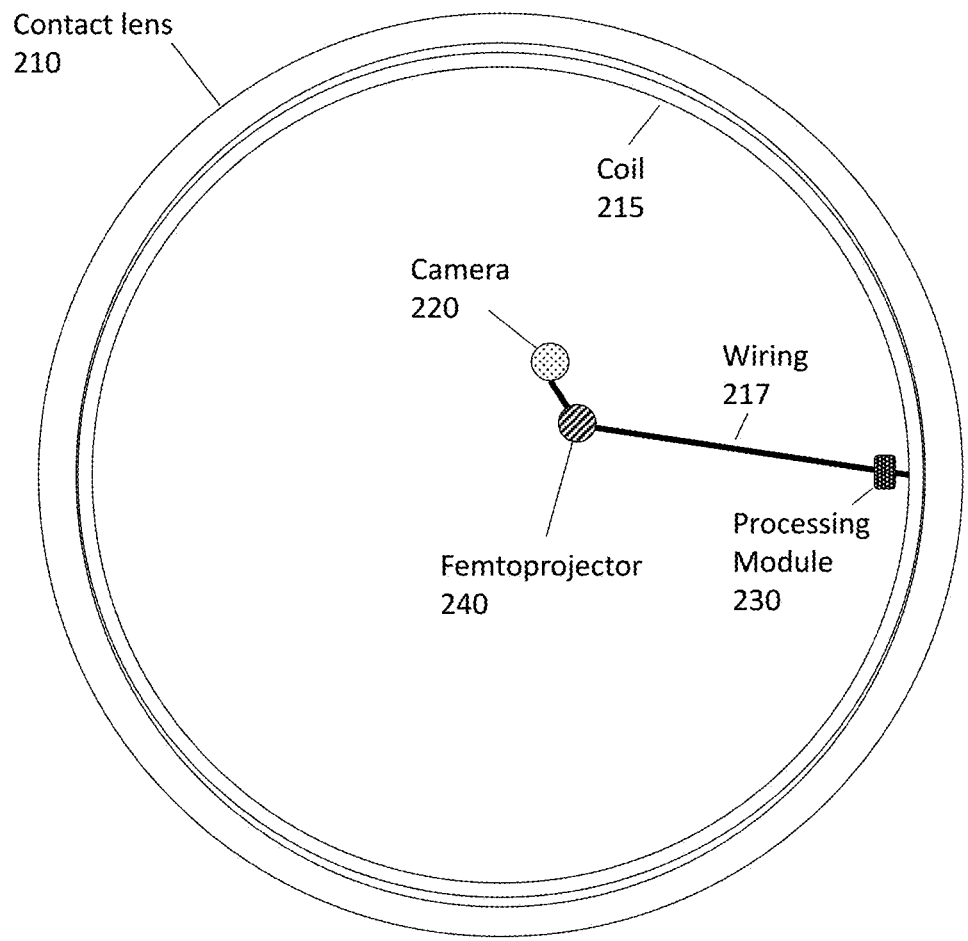
FIG. 2C shows a plan view of the contact lens device.

FIG. 2C shows a plan view of the contact lens 210. This plan view is taken looking at the femtoprojector 240 from the top of FIG. 2A. The ratio of the contact lens diameter to femtoprojector lateral size is preferably roughly 25:1 for the largest femtoprojector. This ratio is normally between about 15:1 and 30:1, but may be as small as 5:1 or as large as 50:1. FIG. 2C shows one camera 220 and one femtoprojector 240 in the contact lens, but multiple cameras or multiple femtoprojectors may be mounted in such a lens. Different femtoprojectors can have different sizes. The femtoprojector 240 need not be in the center of the lens.

The contact lens 210 may also contain other components that are not shown in FIG. 2C for data transmission, power and/or positioning. Data transmission components may include antennae or optical/infrared photodetectors, data storage and buffering, controls, and possibly also on-lens processing. Power components may include batteries for power storage. Positioning components may include accelerometers, gyroscopes, magnetometers and fiducial or other structures used for eye tracking and head tracking.

In addition to the system for enhancing vision of a user with visual impairment, the overall system may also include a head tracker, eye tracker, and scaler. The system receives input images (including possibly video), which are to be displayed to the user via the femtoprojector 240. The femtoprojector 240 projects the images on the user's retina, thus creating an image of virtual objects in the user's field of view. The scaler receives the input images and produces the appropriate data and commands to drive the femtoprojectors. The head tracker and eye tracker provide information about head movement/position and eye movement/position, so that the information provided to the femtoprojector 240 can be compensated for these factors.

There are many ways in which this functionality can be configured with an eye-mounted display(s) to create embodiments of vision enhancement systems. Portions of these subsystems may be external to the user, while other portions may be worn by the user in the form of a headpiece or glasses. Components may also be worn on a belt, armband, wrist piece, necklace, glasses or other types of packs.

Figure 3:
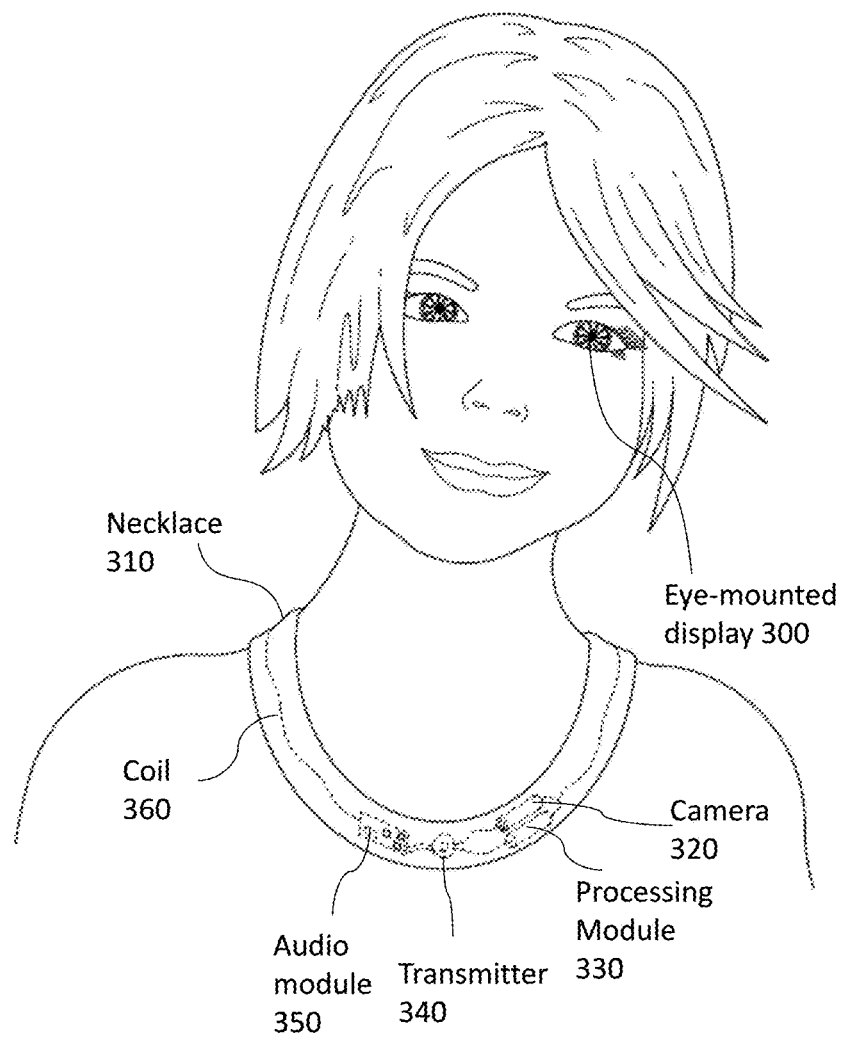
FIG. 3 shows a user wearing a necklace in communication with an eye-mounted display.

For example, FIG. 3 shows an implementation where, in addition to an eye-mounted display 300, the user is also wearing a necklace 310 that contains the other components of a vision enhancement system. In this example, a necklace 310 includes a camera 320 that captures images of the user's unimpaired view of a surrounding environment. The necklace 310 also includes a processing module 330 that modifies the captured images to create compensated images for compensating for the user's visual impairment.

Additionally, the necklace 310 includes a wireless transmitter 340 that transmits the compensated images to the eye-mounted display 300. For an eye-mounted display, this transmission preferably is lower bandwidth, both because the available bandwidth is limited and because it is desirable to reduce the complexity and power consumption of electronics in the eye-mounted display. The necklace 310 also includes an audio module 350 configured to generate audio signals based on the images captured by the camera 320. The audio signals may be played to the user by the audio module 350 or an audio player (e.g., ear plugs) coupled to the audio module 350. The coil 360 is a power coil that transfers power from a power source (e.g., a battery or other types of power source) to the eye-mounted display 300. The camera 320, processing module 330, transmitter 340, the audio module 350, and the coil 360 are shown with broken lines in FIG. 3 because they are placed inside the necklace and invisible from outside. Those components can be located at other positions in the necklace 310 than their positions shown in FIG. 3. Also, the necklace 310 may include additional or fewer components. For example, the necklace 310 can include more than one camera 320.

Figure 4:
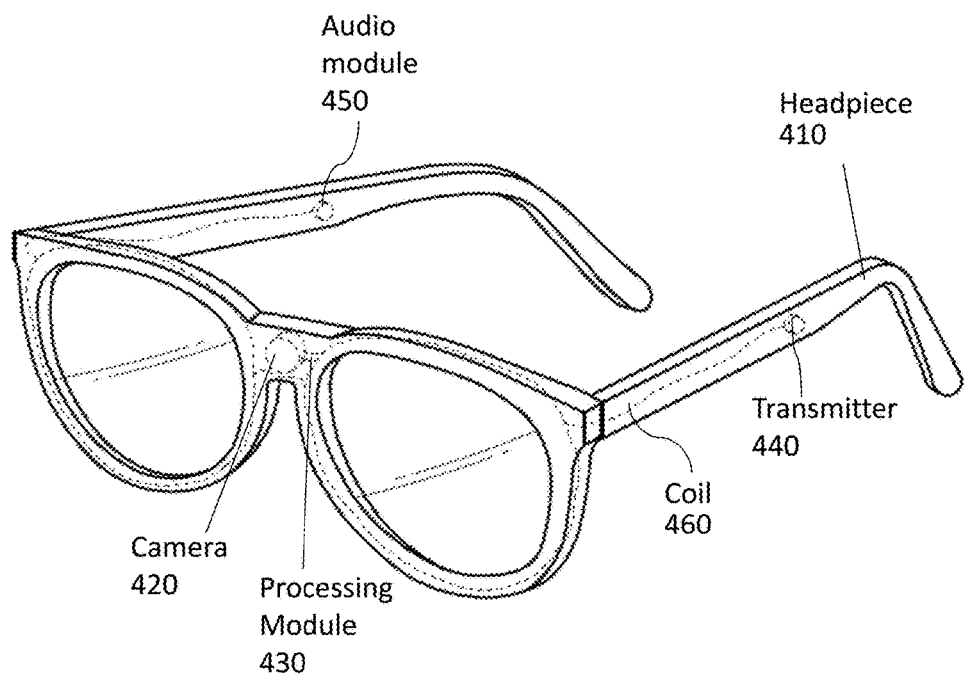
FIG. 4 shows a headpiece in communication with an eye-mounted display.

FIG. 4 shows another implementation where a headpiece 410 contains other components of a vision enhancement system than an eye-mounted display and communicates with the eye-mounted display worn by a user. The user can wear the headpiece 410. The headpiece 410 encloses a camera 420, a processing module 430, a transmitter 440, an audio module 450, and a coil 460. The transmitter 440 transmits compensated images generated by the processing module 430 to the eye-mounted display worn by the user. Also, the audio module 450 generates audio signals based on the images captured by the camera 420. The coil 460 transfers power from a power source to the eye-mounted display. In the example design of FIG. 4, the headpiece 410 is a pair of glasses. In other designs, the headpiece 410 can have other configurations. For example, the headpiece 410 could be a helmet or goggles.

Figure 5A:
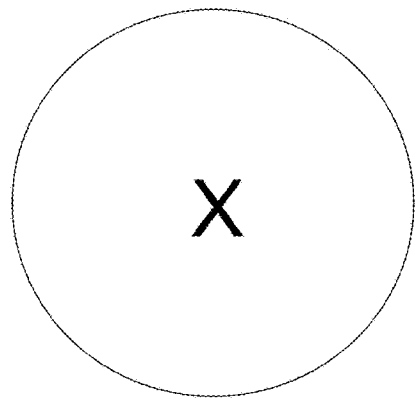
FIGS. 5A-C illustrate compensation for degradation of a foveal section of a user's retina.
Figure 5B:
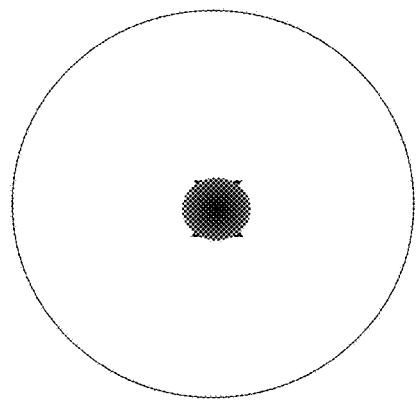
Figure 5C:
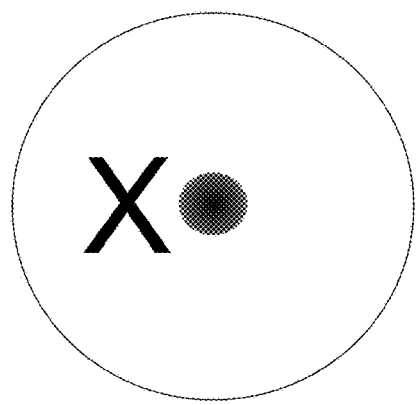

FIGS. 5A-C illustrate compensation for degradation of a fovea section of a user's retina. FIG. 5A shows an image of the user's unimpaired view. FIG. 5B shows the user's impaired view due to a damaged foveal section of the user's retina. FIG. 5C shows a compensated image projected to a more peripheral section of the user's retina.

As shown in FIG. 5A, an "X" occupies the center of a user's unimpaired view. The "X" would be imaged by the user's eye to a foveal section of the user's retina. However, because the user's fovea is degraded, the user's real view is impaired. As shown in FIG. 5B, the user's impaired view does not show the entire "X." Rather, a central portion of the "X" is degraded, as indicated by the gray circle.

As shown in FIG. 5C, the user's impaired view is compensated by a vision enhancement system. A camera of the vision enhancement system captures images of the unimpaired view of "X" shown in FIG. 5A. Ideally, this happens when the user's fovea is pointed at the "X." A processing module magnifies the "X" and the eye-mounted display projects the magnified "X" to a more peripheral section of the retina. As shown in FIG. 5C, the magnified "X" is projected to a left side of the retina. Because the left side of the retina has no degradation, the user can see the "X." The magnification of the "X" is sufficient to compensate for a lower resolution of the peripheral section of the retina, compared with the foveal section of the retina. Thus, the compensated images projected to the peripheral section of the retina have a same or better resolution compared to if the original "X" were imaged to an undamaged fovea. Another option is to down-sample the "X" and keep it the same size.

Figure 6A:
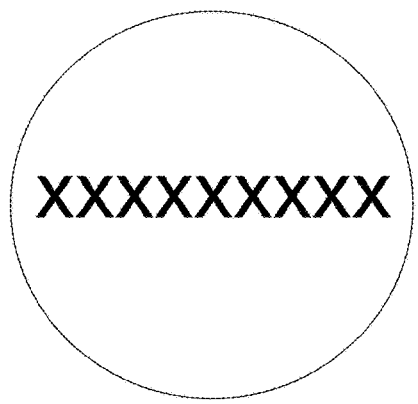
FIGS. 6A-C illustrate compensation for degradation of a periphery section of a user's retina.
Figure 6B:
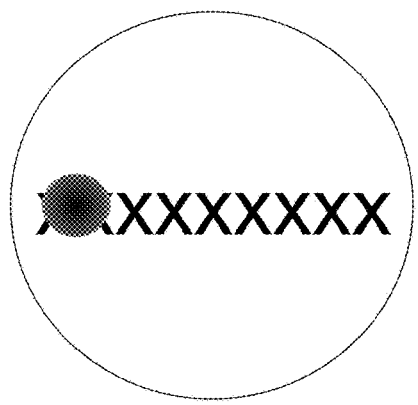
Figure 6C:
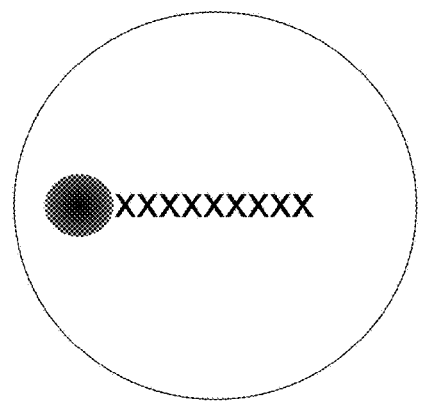

FIGS. 6A-C illustrate compensation for degradation of a periphery section of a user's retina. FIG. 6A shows an image of a user's unimpaired view. The user's unimpaired view has a row of "X"s, some of which are imaged to a periphery section of the user's retina. However, the periphery section of the user's retina is damaged. FIG. 6B shows the user's visual impairment due to a damaged periphery section of the user's retina. As shown in FIG. 6B, the user loses sight of a portion of the "X"s.

The impaired view of the user is compensated by a vision enhancement system. A camera of the vision enhancement system captures images of the user's unimpaired view shown in FIG. 6A. A processing module compresses the angular extent of the captured images. The compressed images are projected to a more central section of the user's retina to avoid the damaged section of the retina. FIG. 6C shows a compensated image generated by a processing module and projected to a more central section of the user's retina by an eye-mounted display. As shown in FIG. 6C, the user now can see the entire row of "X"s. This is important for peripheral vision.

The compression by the processing module compensates for a smaller field of view of the more central section of the retina, compared to the full peripheral section of the retina.

In some embodiments, the processing module sufficiently compresses the angular extent so that the compensated images, when projected to a more central section of the user's retina, include the same angular extent as the user's unimpaired view.

Figure 7A:
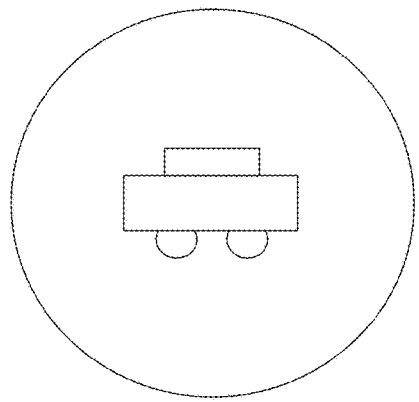
FIGS. 7A-C illustrate compensation for a user's impaired light adaptation to dark environments.
Figure 7B:
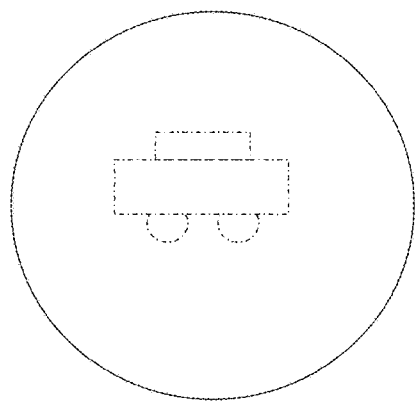
Figure 7C:
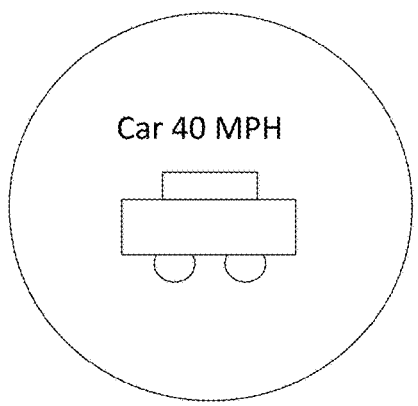

FIGS. 7A-C illustrate compensation for impaired light adaptation to dark environments. Impaired light adaption can be night blindness or slow light adaption during a transition from a brighter environment to a darker environment. FIG. 7A shows an image of a user's unimpaired view of a car. FIG. 7B shows the image of a night blindness view of the car. The car in FIG. 7B is shown with broken lines, meaning the car appears blurry or otherwise less visible to the user.

To compensate for the night blindness, a vision enhancement system captures images of a surrounding environment of the user and modifies the captured images by enhancing the contrast of the captured images. The vision enhancement system also identifies the car in the captured images and includes identification of the car in the compensated images. Additionally, the vision enhancement system detects a speed of the car based on the captured images. For example, the vision enhancement system measures a change in distance from the car to the user based on two captured images and calculates the speed of the car based on the change in distance and a difference between times when the two images were captured. Further, the vision enhancement system projects the compensated images to the user by an eye-mounted display. FIG. 7C shows a compensated image projected to the user. As shown in FIG. 7C, the compensated image includes a contrast enhanced view of the car as well as a message identifying the car and a speed of the car. Being made aware of the presence of the car and the speed of the car, the user can avoid the car and stay safe. In some embodiments, the car is highlighted in the compensated image, for example by color, brightness, or labelling, if it is a threat to the user. As other examples of situational awareness, the vision enhancement system can also enhance edges of a sidewalk, issue alerts for hazardous objects outside the user's restricted field of view, or provide other types of hazard avoidance.

Although the detailed description contains many specifics, these should not be construed as limiting the scope of the invention but merely as illustrating different examples and aspects of the invention. It should be appreciated that the scope of the invention includes other embodiments not discussed in detail above. For example, machine learning can be used for object recognition or facial identification. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

Alternate embodiments are implemented in computer hardware, firmware, software, and/or combinations thereof Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method for enhancing vision of a user with visual impairment, the method comprising:
   capturing images of a user's unimpaired view of a surrounding environment;
   modifying the captured images to create compensated images, the modification compensating for the user's visual impairment; and
   projecting, by an eye-mounted display, the compensated images onto the user's retina;
   where the visual impairment is that a portion of the user's unimpaired view would be imaged by the user's eye to a damaged section of the user's retina, and the eye-mounted display projects the compensated images away from the damaged section of the user's retina.

2. The method of claim 1, where modifying the captured images further comprises magnifying the captured images.

3. The method of claim 1, where the damaged section is a foveal section of the retina, and the eye-mounted display projects the compensated images to a more peripheral section of the retina.

4. The method of claim 3, where modifying the captured images comprises magnifying the captured images so that the compensated images projected to the peripheral section of the retina have a same or better resolution compared to if the user's unimpaired view would be imaged onto an undamaged fovea.

5. The method of claim 1, where the damaged section is a peripheral section of the retina, and the eye-mounted display projects the compensated images to a more central section of the retina.

6. The method of claim 5, where modifying the captured images comprises compressing an angular extent of the captured images.

7. The method of claim 6, where the captured images are sufficiently compressed in angular extent, so that the compensated images projected to the more central section of the retina represent a same or larger field of view than the user's unimpaired view.

8. The method of claim 1, where modifying the captured images further comprises:
   identifying one or more objects in the captured images; and modifying the captured images to include identification of the one or more objects.

9. The method of claim 1, where the captured images include a person's face and modifying the captured images further comprises enhancing facial features of the person's face.

10. The method of claim 1, where the captured images include a person's face and the method further comprises:
identifying the person based on the captured image of the person's face.

11. The method of claim 1, where the captured images include a person's face and the method further comprises:
determining whether the person is speaking to the user based on the captured image of the person's face.

12. The method of claim 1, where the captured images include text and modifying the captured images further comprises at least one of enlarging a font size of the text, changing a color of the text, and changing a color of a background to the text.

13. The method of claim 1, further comprising:
generating audio based on the captured images; and
playing the audio to the user.

14. A method for enhancing vision of a user with visual impairment, the method comprising:
capturing images of a user's unimpaired view of a surrounding environment;
modifying the captured images to create compensated images, the modification compensating for the user's visual impairment; and
projecting, by an eye-mounted display, the compensated images onto the user's retina;
where the visual impairment is impaired adaptation of the eye to dark environments, and modifying the captured images comprises enhancing a contrast of the captured images.

15. The method of claim 14, where the visual impairment is night blindness.

16. The method of claim 14, where the visual impairment is slow adaptation of the eye when transitioning from brighter to darker environments, and modifying the captured images comprises temporarily enhancing a contrast of the captured images during said transition.

17. A method for enhancing vision of a user with visual impairment, the method comprising:
capturing images of a user's unimpaired view of a surrounding environment;
modifying the captured images to create compensated images, the modification compensating for the user's visual impairment; and
projecting, by an eye-mounted display, the compensated images onto the user's retina;
where the captured images include a person's face and modifying the captured images comprises:
identifying an emotion of the person based on the person's face; and
modifying the captured images to include identification of the emotion.

18. A system for enhancing vision of a user with visual impairment, comprising:
one or more cameras that capture images of a user's unimpaired view of a surrounding environment;
a component that modifies the captured images to create compensated images, the modification compensating for the user's visual impairment; and
an eye-mounted display that projects the compensated images onto the user's retina;
where the visual impairment is that a portion of the user's unimpaired view would be imaged by the user's eye to a damaged section of the user's retina, and the eye-mounted display projects the compensated images away from the damaged section of the user's retina.

19. The system of claim 18, where the eye-mounted display comprises a contact lens and a femtoprojector mounted in the contact lens, and at least one camera is mounted in the contact lens.

* * * * *